United States Patent [19]

Chavis

[11] 3,904,155
[45] Sept. 9, 1975

[54] HELICOPTER STEP AND CARGO CARRIER ASSEMBLY

[75] Inventor: Gene Chavis, Anchorage, Alaska

[73] Assignee: Alaska-Sky Craft Co., Inc., Anchorage, Alaska

[22] Filed: May 13, 1974

[21] Appl. No.: 469,291

[52] U.S. Cl.... 244/118 R; 224/42.42 R; 244/129 S; 244/137 P
[51] Int. Cl.² ........................................ B64D 9/00
[58] Field of Search ........ 244/118 R, 118 P, 137 R, 244/137 P, 129 S, 17.11, 17.17; 224/29 R, 42.41, 42.42 R, 42.43, 42.32; 108/42, 44; 5/81 R, 82, 119; 296/19

[56] References Cited
UNITED STATES PATENTS

| | | | |
|---|---|---|---|
| 3,154,270 | 10/1964 | Jensen | 244/17.17 X |
| 3,304,116 | 2/1967 | Stryker | 5/81 R X |
| 3,778,011 | 12/1973 | Cannon | 244/17.11 X |

OTHER PUBLICATIONS

"Hiller H-23B Ambulance Helicopter" *Jane's All The World's Aircraft*, 1952-1953, p. 216.

Primary Examiner—Trygve M. Blix
Assistant Examiner—Barry L. Kelmachter
Attorney, Agent, or Firm—Dowrey & Cross

[57] ABSTRACT

A helicopter step and cargo assembly comprising a tubular frame adapted to be connected directly to the skid tube supports or other undercarriage of a helicopter which provides an elongated horizontal surface of substantial length, having an offset portion extending between the supports. The tubular frame is designed to allow maximum load carrying area with a minimum drag on the aircraft. The tubular frame includes side rails for securing cargo with the outboard side rail being hinged or swingably attached to the frame so as to be swung downwardly when the frame is used as a step for boarding or leaving the helicopter.

8 Claims, 6 Drawing Figures

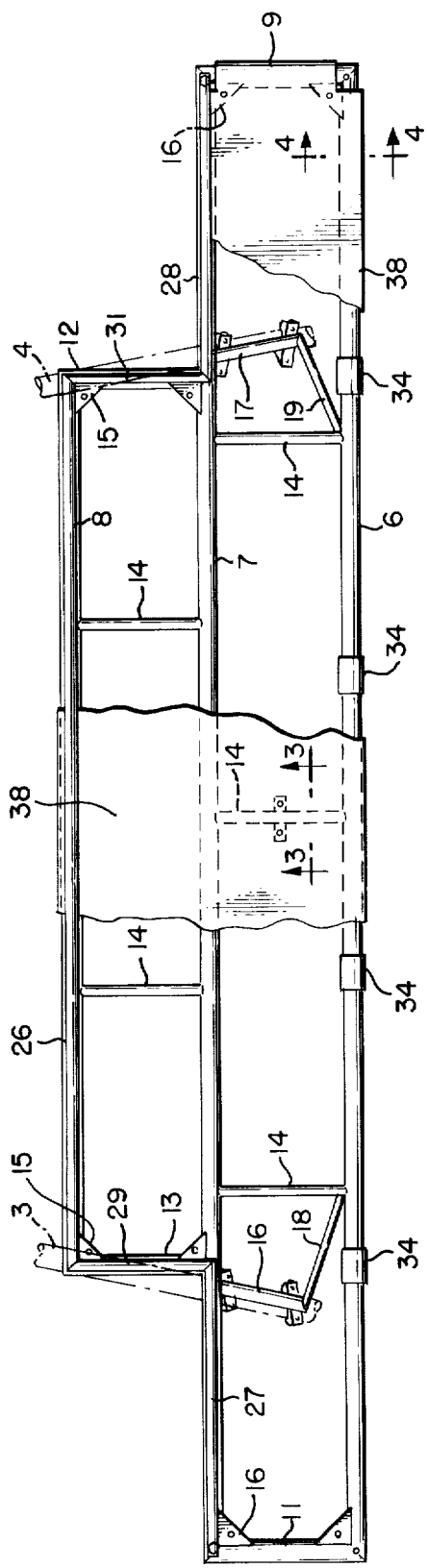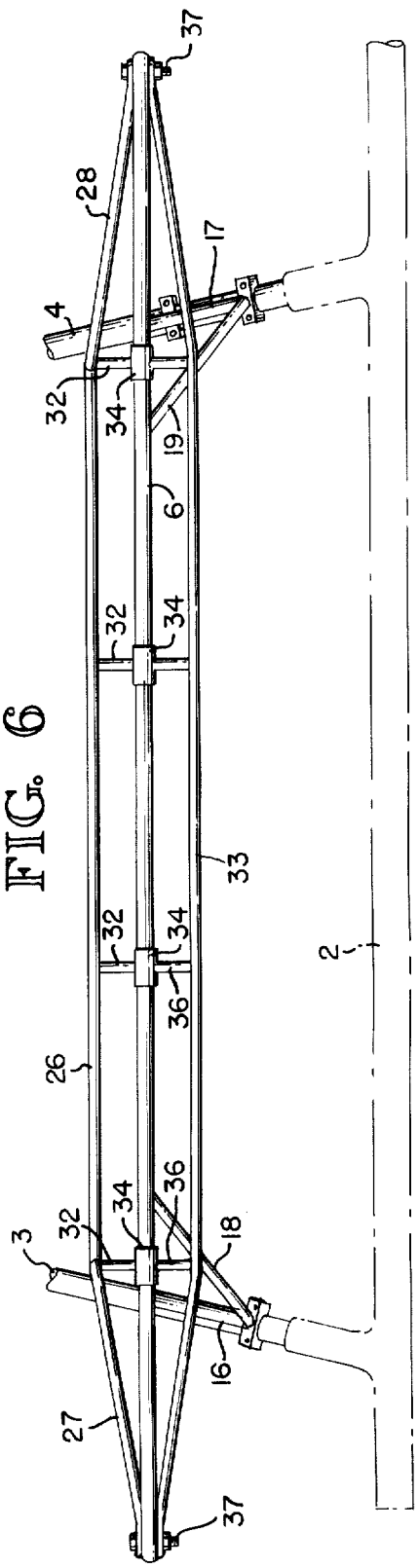

HELICOPTER STEP AND CARGO CARRIER ASSEMBLY

BACKGROUND OF THE INVENTION

1. Field of the Invention

This invention relates to cargo carrier attachments for aircraft and more particularly, to such devices as applied to helicopters.

2. Description of the Prior Art

With the increased usage of helicopters in such activities as forest management, rough terrain surveying, and simply hauling supplies and equipment to remote areas, a need has arisen for an efficient cargo carrier assembly adapted for use with an increasing number of different helicopter designs. Prior art attempts to meet this need have resulted in a number of expedients such as attaching cargo directly to the skids or undercarriage of the helicopter or any convenient spot where possible with very little attention to safety, aerodynamic stability of the aircraft and Federal Aviation Administration standards. Needless to say, this approach provides for only limited carrying capacity and, in most cases, is extremely unsafe. Other devices have been conceived in the nature of rather crude baskets or carriers attached to the skids or other undercarriage of the helicopter. This basket-type carrier, typically interferes with boarding and unloading of the helicopter cabin since the only convenient location for attachment is near the cabin doors. Such experimental devices have also presented aerodynamic drag problems because of their positioning or configuration and often interfere with the mounting of auxillary equipment to the helicopter undercarriage such as inflatable floats and the like.

SUMMARY OF THE INVENTION

According to the present invention, a cargo carrier and step assembly is provided, which not only performs the function of a demountable cargo carrier with increased carrying capacity and decreased aerodynamic drag, but also, the function of a step. The step provided by the assembly is useful for boarding and unloading the helicopter cabin during normal use and is extremely convenient for such operations as smoke jumping. The carrier assembly provides the jumper with a platform area which insures clearance of the undercarriage when leaving the craft in flight. The cargo carrying capacity of the assembly is adaptable for extremely long loads such as surveying equipment and the like. The carrier may extend the entire distance between the skid supports and even beyond on both sides of the helicopter as well as laterally between the skid supports.

Accordingly, the primary object of the present invention is to provide a cargo carrier having an increased carrying capacity and the capability of doubling as a step for the aircraft. Another object of the present invention is to provide a cargo carrier of the character described having a flat deck and swingable outboard side rails for safety purposes when used as a passenger step.

Other objects and advantages of the present invention will be apparent from the following specification and from the accompanying drawings.

DESCRIPTION OF THE DRAWINGS

FIG. 5 is a top plan view of the cargo carrier and step assembly; and

FIG. 6 is a side elevational view of the cargo carrier and step assembly.

DETAILED DESCRIPTION OF THE PREFERRED EMBODIMENT

Figure 1:
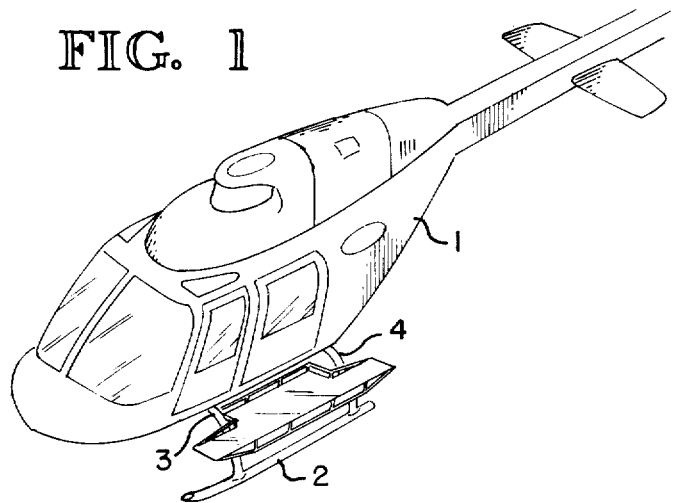
FIG. 1 is a perspective view of a typical helicopter fuselage with the cargo carrier and step of the present invention attached thereto.

FIG. 1 illustrates a helicopter having a fuselage 1 and an undercarriage or landing gear including, in this instance, the skids 2 and the longitudinally spaced skid tube supports 3 and 4. Although the present embodiment is shown with skid members 2, it will be understood by those skilled in the art that other landing devices such as skis or floats may be utilized, depending upon the terrain over which the helicopter is to be used. The manner in which the skid supports 3 and 4 are connected to the fuselage 1 and to the skids or other members 2 forms no part of the present invention but it will be understood that these members are fixed relative to the fuselage. There will, of course, be a skid or other device on both sides of the fuselage and the supports 3 and 4 are essentially inverted U-shaped tubular members extending between the skids and secured to the bottom of the fuselage. These support members provide the attaching surface for the cargo carrier and step assembly.

Referring to FIG. 5, a rectangular main frame with a rectangular offset portion is made up of the inboard frame member 8. The frame members 6 and 7 are connected by the end frame members 9 and 11. Likewise, the intermediate frame 7 is connected to the inboard frame member 8 by a second set of lateral members 12 and 13. The frame members so far described may be made of tubular stock and may be welded to form a unitary planar main frame with additional tubular cross braces 14 as indicated. Gussets 15 are located in each corner for a purpose presently to be described.

Figure 2:
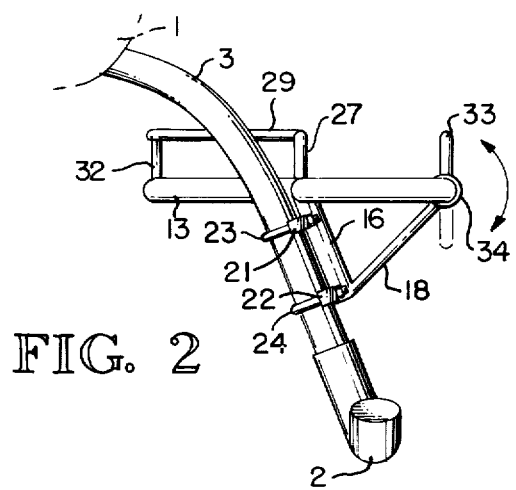
FIG. 2 is a front view of the skid tube supports of the helicopter with the cargo carrier attached.
Figure 3:
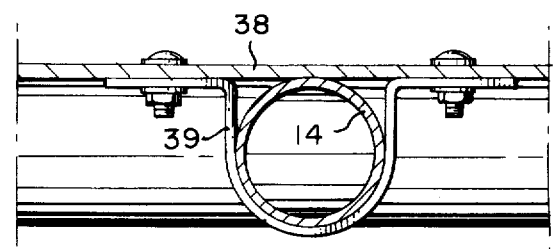
FIG. 3 is a cross-sectional detail taken along lines 3—3 of FIG. 5.
Figure 4:
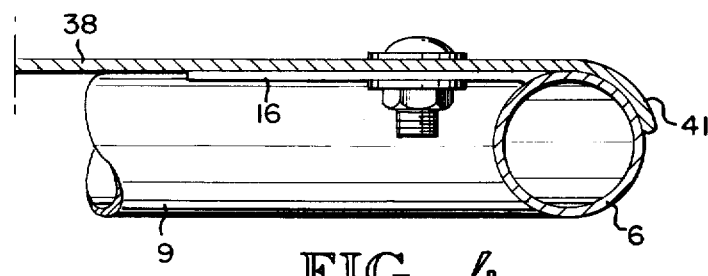
FIG. 4 is a cross-sectional detail taken along lines 4—4 of FIG. 5.

The main frame is attached to the skid supports by means of the downwardly extending legs 16 and 17. These legs are welded to the intermediate tubular frame member 7 and may be positioned so as to be substantially parallel with the front and rear skid supports 3 and 4 as illustrated in FIG. 2. Each leg 16 and 17 will be provided with a brace or strut 18 and 19 respectively extending between and welded to the lower end of the leg and the outboard frame member 6. Each leg will also be provided with two spaced clamp beds 21 and 22 as shown most clearly in FIG. 2 which may be welded or otherwise attached to the legs and which are designed to accomodate the C-clamps 23 and 24 respectively for clamping the cargo carrier to the skid supports 3 and 4. The C-clamps are conventional hardware and serve to clamp the legs 16 and 17 directly to supports 3 and 4 respectively. These clamps may also be provided with some sort of a coating or covering (not shown) to protect the metal of the supports if desired.

Cargo securing means are provided by the inboard side rails 26, 27 and 28 and the connecting rails 29 and 31. These rails are supported by vertical tubular members 32 which may be welded into place. It will also be noted that the front and rear inboard rails 27 and 28 respectively are inclined downwardly from the level of the inboard rail 26 to the level of the rail 7 which gives the overall profile of the cargo carrier a streamlined appearance for aerodynamic reasons. A single outboard side rail 33 is rotatably mounted on the outboard frame rail 6 by means of the sleeves 34 which are attached to the rail 33 by means of the connecting members 36. With this arrangement, the outboard side rail 33 may be pivoted between a raised position shown in dotted lines in FIG. 2 and full line in FIG. 6 when the cargo carrier is used as a step. It will also be noted that the ends of the side rail 33 slope downwardly to the level of the outboard frame rail 6 to give the rail the same streamlined appearance as described in the case of the inboard rails 27 and 28. The side rail 33 may be held in either the raised or lowered position by means of the bolts 37 or their equivalent.

As previously described, the entire surface of the cargo carrier is covered with a lightweight sheet material such as fiberglass 38 which is secured to the main frame assembly by means of bolts or other attaching means. The molded sheet floor is secured to the gussets 15 and to clamps 39 which extend about the cross braces 14. It will be understood, of course, that the means for securing the floor to the main frame may be varied as desired. It will also be noted that the longitudinal edges and end edges of the molded sheet floor 38 may be curved downwardly as at 41 to eliminate exposed edges and to present a smooth appearnce. Any form of anti-skid coating or tape may be applied to the floor 38 for safety purposes.

For installation of the carrier assembly it is merely necessary to place the C-clamps about the front and rear skid supports and secure them to the clamp beds 21 and 22. The carrier assemblies may be positioned at the desired height relative to the cabin and the installation is complete. The side rails 26, 29, 31 and 33 may be used as convenient surfaces for securing the cargo to the carrier. It is advisable, of course, to distribute the cargo evenly forward and aft of the carrier centerline on each side of the helicopter. The swingable rail 33 may be held in the lowered position at all times except when it is necessary for securing cargo. This arrangement provides an excellent step or platform for passengers and crew either on the ground or during flight.

While the preferred embodiment has been illustrated and described, it should be understood that variations will be apparent to one skilled in the art without departing from the principles of the invention. Accordingly it is to be understood that the invention is not limited to the the embodiment illustrated but rather is to be limited only by a liberal interpretation of the claims appended hereto.

The embodiment of the invention in which an exclusive property or privelege is claimed are defined as follows:

1. In combination with a helicopter type aircraft having a landing gear undercarriage and a door; a cargo carrier and step assembly comprising; an elongated substantially rigid cargo carrying frame, means to secure said frame to said undercarriage such that said frame extends parallel to the longitudinal axis of the aircraft adjacent the door, means on said frame forming a generally horizontal support surface, an outboard rail member extending along the outboard edge of said frame, and means connecting said rail to said frame for swinging movement between raised and lowered positions extending respectively above and below said surface.

2. The combination according to claim 1 including a rigid cargo support surface covering substantially the entire area of said frame.

3. An aircraft cargo carrier and step assembly comprising; an eb ngated substantially rigid main frame of generally flat configuration including longitudinal edges, means connecting said frame to the landing gear undercarriage of the aircraft such that said longitudinal edges are respectively located inboard and outboard of the aircraft fuselage and extend parallel to the longitudinal axis thereof in a generally horizontal plane, inboard and outboard longitudinal side rails disposed above the plane of the main frame and connected respectively to the longitudinal inboard and outboard edges of the main frame, means on said main frame forming a support surface, and means connecting said outboard rail to the outboard frame edge for swinging betweeen a raised position above said frame for cargo carrying and a lowered position below said frame when the support surface is used as a step for personnel entering and leaving the aircraft.

4. The device according to claim 3 including means to lock said outboard rail in its raised and lowered positions.

5. The device according to claim 3 wherein; said undercarriage includes longitudinal spaced supports, and said means for securing said frame to the undercarriage comprise 6. The device according to claim 5 wherein said main frame extends longitudinally beyond said supports and includes a laterally offset portion extending between the supports in the general plane of said main frame.

7. The device according to claim 6 wherein the forward and rear ends of said side rails are sloped downwardly to the plane of the main frame.

8. The device according to claim 7 wherein said means forming a support surface comprises a continuous rigid covering extending over substantially the entire area of said main frame.

* * * * *

UNITED STATES PATENT OFFICE
CERTIFICATE OF CORRECTION

Patent No. 3,904,155          Dated September 9, 1975

Inventor(s) Gene Chavis

It is certified that error appears in the above-identified patent and that said Letters Patent are hereby corrected as shown below:

Column 3, line 54, "embodiment" should read --embodiments--.
    Column 4, line 42, after "comprise" insert --adjustable clamp means securing the frame to the supports.--

Signed and Sealed this ninth Day of December 1975

[SEAL]

Attest:

RUTH C. MASON
*Attesting Officer*

C. MARSHALL DANN
*Commissioner of Patents and Trademarks*